June 28, 1960

J. A. HALL 2,942,744

HOUSE AND BOAT TRAILER

Filed April 22, 1958

INVENTOR.
JACK A. HALL
BY
McMorrow, Berman & Davidson
ATTORNEYS

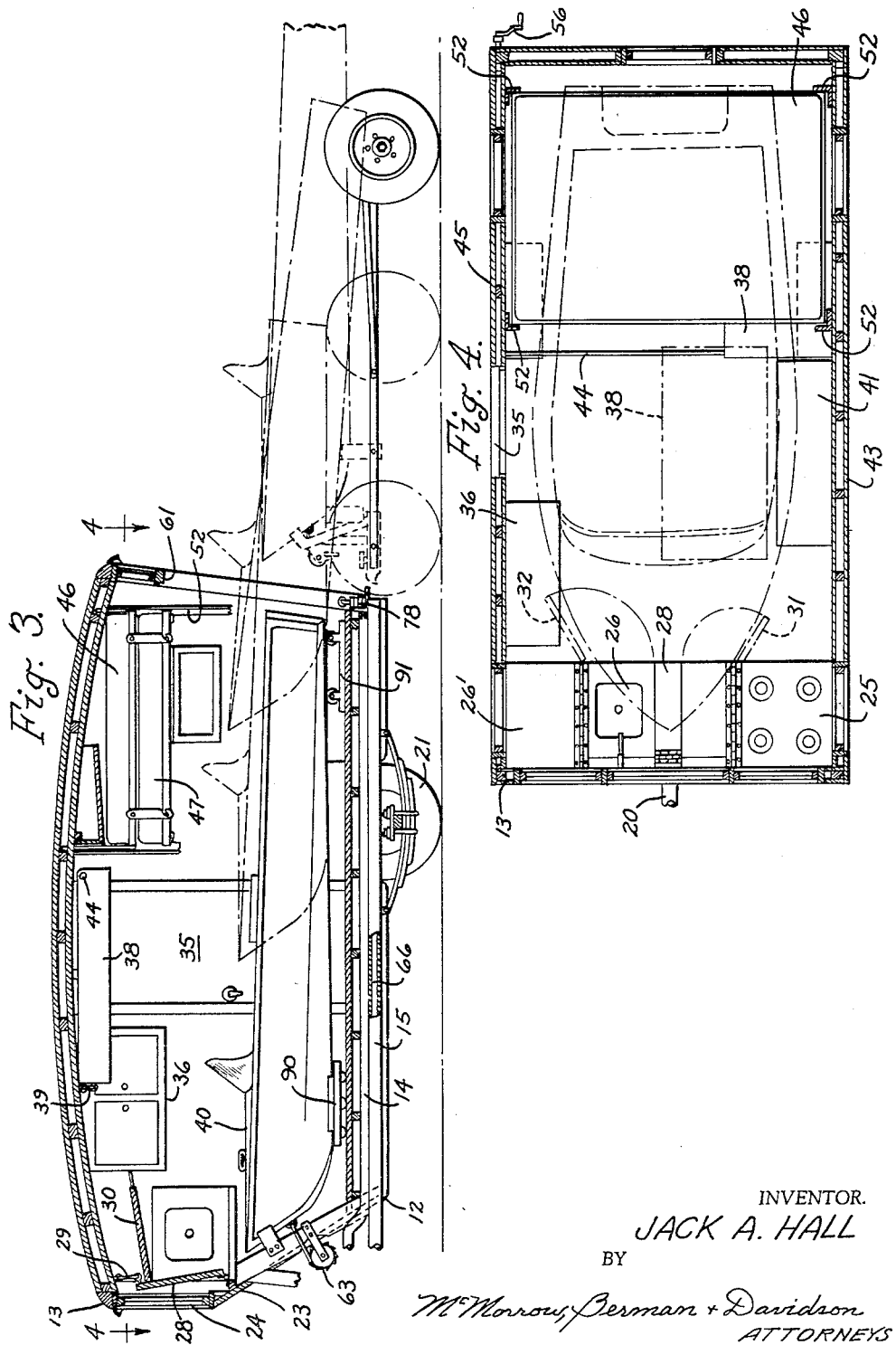

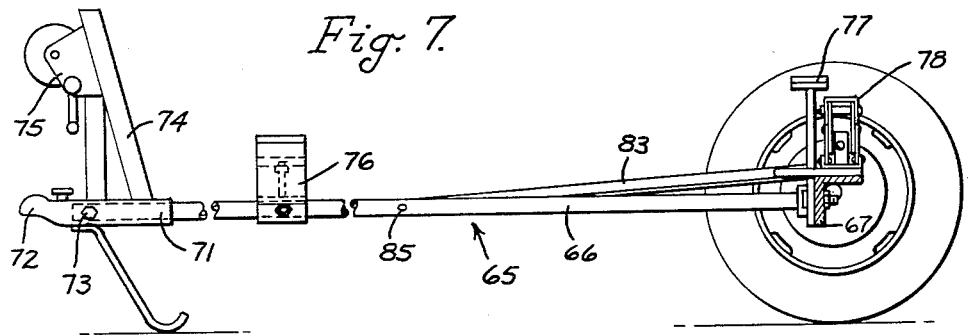
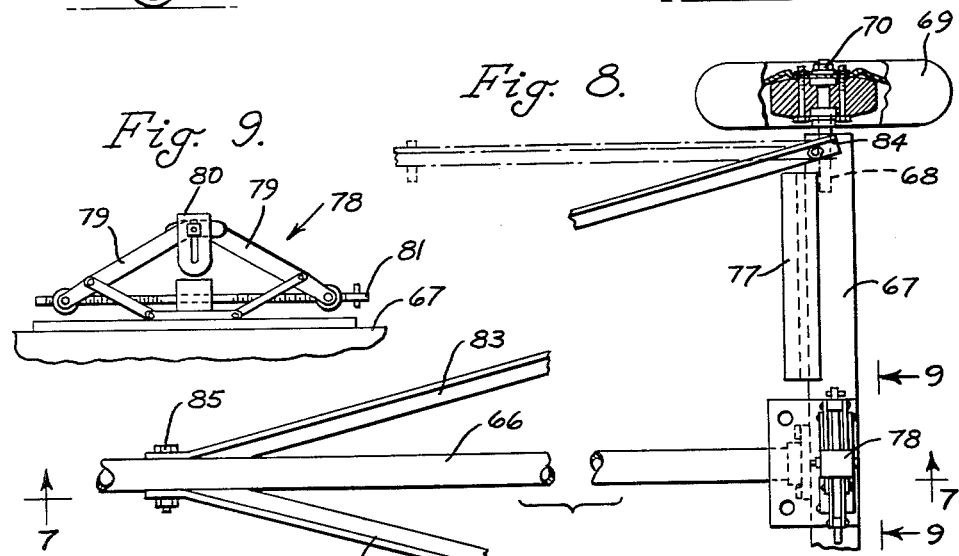
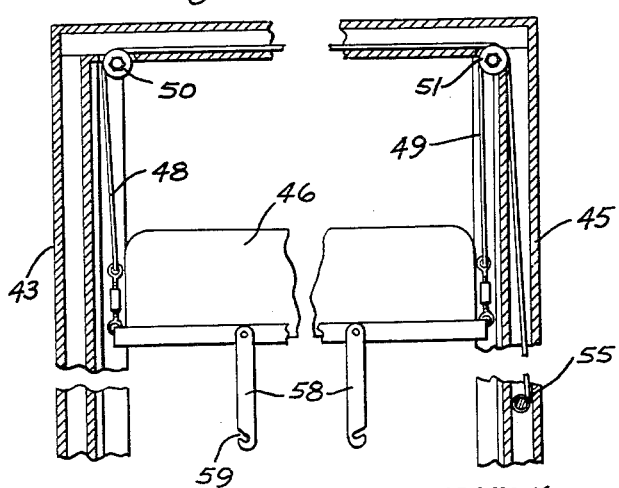

United States Patent Office 2,942,744
Patented June 28, 1960

2,942,744

HOUSE AND BOAT TRAILER

Jack A. Hall, 1247 W. 160th St., Gardena, Calif.

Filed Apr. 22, 1958, Ser. No. 730,214

3 Claims. (Cl. 214—500)

This invention relates to trailers, and more particularly to a trailer vehicle adapted to be employed both as a house trailer and as a means for storing a boat for transportation.

A main object of the invention is to provide a novel and improved combination house and boat trailer which is simple in construction, which is relatively compact in size, and which is arranged so that it may be employed to transport a boat but may be readily set up for use as a house trailer whenever desired.

A further object of the invention is to provide an improved combination house trailer and boat trailer which is relatively inexpensive to fabricate, which is rugged in construction, and which includes means for storing a boat and its launching trailer for transportation and being arranged so that the launching trailer and the boat may be easily removed so that the main portion of the trailer vehicle may be converted for use as a house trailer.

Further objects and advantages of the invention will become apparent from the following description and claims, and from the accompanying drawings, wherein:

Figure 3 is a longitudinal vertical cross sectional view, similar to Figure 2, but showing the trailer vehicle with the boat received therein and illustrating in dotted view the various stages of movement of the boat as it is placed in the main trailer vehicle for transportation.

Figure 4 is a horizontal cross sectional view taken on the line 4—4 of Figure 3.

Figure 6 is an enlarged transverse vertical cross sectional view taken on the line 6—6 of Figure 2.

Figure 7 is an enlarged fragmentary longitudinal vertical cross sectional view taken through the boat launching trailer associated with the trailer vehicle of Figures 1 to 6, said view being taken substantially on the line 7—7 of Figure 8.

Figure 8 is a fragmentary top plan view, partly in horizontal cross section, of the structure shown in Figure 7, to a somewhat enlarged scale.

Figure 9 is an enlarged elevational detail view taken on the line 9—9 of Figure 8.

Figure 1:
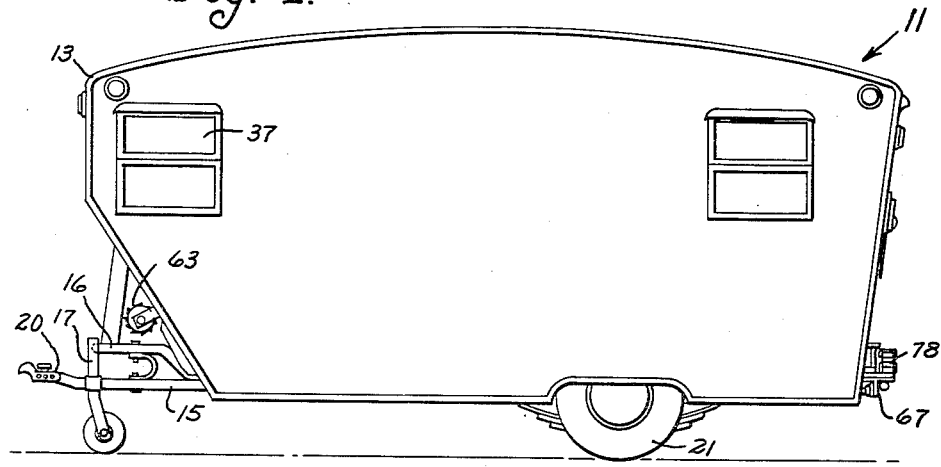
Figure 1 is a side elevational view of an improved combination house trailer and boat trailer constructed in accordance with the present invention.

Referring to the drawings, the combination house trailer and boat trailer is designated generally at 11 and comprises a wheeled frame 12 on which is mounted the trailer housing 13. The frame 12 comprises a supporting rigid framework including the central longitudinal tubular bar members 14 and 15 rigidly secured together in vertical alignment, the upper longitudinal bar member 14 being vertically offset at its forward end, as shown at 16, the ends of the tubular bar members 14 and 15 being rigidly connected to a vertical caster post member 17 in which is swivelly mounted a supporting caster 18. Rigidly connected to and projecting forwardly from the junction 19 between the forward end of the longitudinal tubular bar member 15 and the vertical post member 17 is a hitch tongue 20 of conventional construction adapted to be connected in the usual manner to the towing hitch element of an automobile or similar tractive vehicle.

The frame 12 is provided with the usual road wheels 21 resiliently secured to the rear side portions thereof by suitable leaf spring assemblies 22 of conventional construction.

The trailer housing 13 comprises a forward end wall having the upwardly and forwardly inclined lower portion 23 and provided thereabove with a window 24. The forward end portion of the housing 13 is arranged as a kitchen and includes a cooking range 25 in one forward corner and a refrigerator 26′ in the opposing forward corner, the space therebetween including the upwardly swingable sink 26 and counter 27. Hinged to the forward end wall of the housing between the upwardly swingable sink 26 and counter 27 is a central counter segment 28 which may be swung upwardly to the position thereof shown in Figure 3 and which may be fastened in its upwardly swung position by a suitable hook or latch member 29, whereby the front wall 30 of the segment 28 is disposed in an elevated position substantially parallel to the roof of the housing 13.

Figure 5:
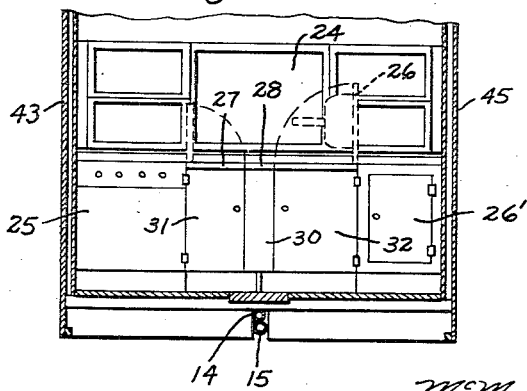
Figure 5 is an enlarged transverse vertical cross sectional view taken on the line 5—5 of Figure 2.
Figure 10:
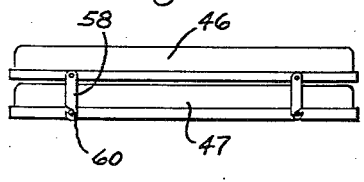
Figure 10 is an elevational detail view taken on the line 10—10 of Figure 2.

As shown in dotted view in Figure 5, the sink 26 may be swung upwardly to an elevated position, and the counter segment 27 may be swung upwardly to a substantially vertical position, the members 26 and 27 being retained in their elevated positions by any suitable latch means of conventional construction. Cupboard spaces are normally defined below the counter 27 and sink 26, said cupboard spaces being provided with the hinged doors 31 and 32 which may be swung to rearwardly and outwardly extending positions, as shown in dotted view in Figure 4 to provide clearance space for the bow portion of a boat to be stored in the housing 13, as will be presently described.

The sink 26 has a drain conduit 33 which is detachably connected to a drain outlet 34 provided in the forward end of the housing 13, whereby the drain conduit 33 may be disconnected from the fixed outlet conduit 34 when the sink is to be swung to its elevated position, shown in dotted view in Figure 5.

A door 35 is provided in one side wall of the housing 13, and a cupboard 36 is secured to the upper portion of said side wall between the door 35 and a window 37 provided in the side wall adjacent the forward end wall of the trailer housing. A transversely extending cupboard 38 is hinged to the ceiling of the housing 13 rearwardly adjacent the door 35, the cupboard 38 defining a partition between the forward compartment of the housing 13 and the rear compartment thereof, said rear compartment being utilized as a bedroom. The closet 38 is swingable forwardly and upwardly to a substantially horizontal position adjacent the ceiling of the trailer housing and may be fastened in said elevated position by suitable conventional latch means 39, as shown in Figure 3, whereby to provide clearance therebeneath for the boat 40 to be stored in housing 13, as will be presently explained.

An additional cupboard 41 is fixedly secured to the trailer side wall opposite the door 35, as shown in Figure 4. The cupboard 41 is similar to the cupboard 36 and is fastened to the upper portion of the side wall of the trailer opposite the door 35.

The closet 38 is normally located adjacent one side wall 43 of the trailer housing, as shown in Figure 4, but is suitably mounted for transverse sliding movement to a position located sufficiently inwardly of the cupboard 41 so that it may be swung to the horizontal position thereof shown in Figure 3. Thus, the closet 38 is hingedly and slidably supported on a transversely extending rod 44 secured between the upper portions of the side walls 43 and 45 of the trailer housing 13 subjacent the ceiling thereof, so that the closet 38 may be displaced inwardly and then rotated to the substantially horizontal position thereof shown in Figure 3 when it is desired to secure the closet in its elevated, out-of-the-way position.

The rod 44 may be further employed as a support for suitable curtains which may be provided to define a partition between the forward space and the bedroom space of the trailer housing.

Figure 2:
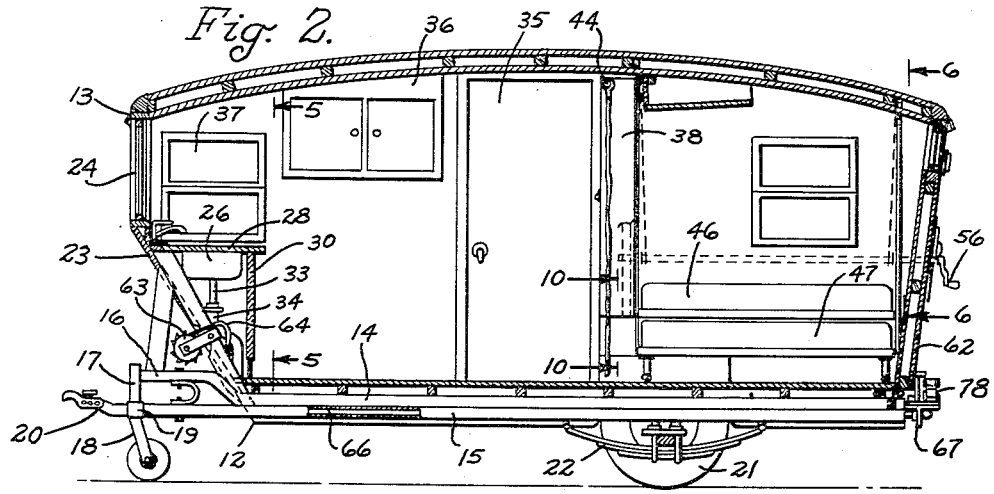
Figure 2 is a longitudinal vertical cross sectional view taken through the trailer vehicle shown in Figure 1 with the vehicle set up as a house trailer but with the main frame portion of the launching trailer for the boat associated therewith received in its stored position in the frame of the main trailer vehicle.

Designated at 46 and 47 are respective beds which are disposed one above the other in a rectangular space defined by four vertical corner angle bars 52 which are rigidly secured in the rear space in the trailer housing 13, the angle bars being secured to the respective side walls 45 and 43 in opposing pairs, as shown in Figure 4, to define a vertical guideway in which the horizontal rectangular beds 46 and 47 are vertically slidable. The upper bed 46 is supported at its corners on respective pairs of cables 48 and 49 secured to its corners at its opposite sides, as shown in Figure 6, said cables extending over suitable pulleys 50 and 51 journaled in the ceiling of the trailer housing 13 and being secured to a longitudinal winch rod 55 journaled horizontally in the housing side wall 45. The winch rod 55 is provided with an external operating handle 56 located adjacent the rear end wall of the trailer housing, as shown in Figure 2, whereby the cables 48 and 49 may be wound up on the rod 55 when the rod is rotated by means of its handle 56. Respective pairs of link bars 58, 58 are pivoted to the respective sides of the frame of the upper bed 46, said link rods being formed with notches 59 at their free ends defining hooks engageable with pins 60 on the frame of the subjacent bed 47, whereby the beds may be at times fastened together for simultaneous vertical movement. Thus, the lower bed 47 may be fastened to the upper bed 46 by means of the hook bars 58 so that both beds may be simultaneously elevated to an out-of-the-way position adjacent the ceiling of the trailer housing, as shown in Figure 3, to provide clearance space therebeneath for the reception of the boat 40.

The rear end wall of the trailer housing 13 is formed with a large rectangular aperture 61 which is normally closed off by a removable panel 62, said panel being provided with suitable latch means for locking same in the aperture 61. However, the panel 62 may be readily removed by releasing its latch means, to define an opening to receive the boat 40 when it is to be stored in the trailer housing 13.

Mounted in the inclined lower portion 23 of the front end wall of the trailer housing is a conventional winch assembly 63 provided with a cable 64 which extends into the interior of the trailer housing 13 and which may be employed to pull the boat 40 into the trailer housing.

Referring now to Figures 7, 8 and 9, 65 generally designates a launching frame comprising a main longitudinal rod member 66 to the rear end of which is rigidly secured a transversely extending axle bar 67. Rigidly secured to the ends of the axle bar 67 are the respective outwardly projecting transverse axle elements 68, 68 on which are rotatably and removably mounted respective supporting wheels 69, the wheels 69 being fastened in any suitable manner on the axle elements 68 for rotation thereon, as by retaining nut 70, but being readily removable from the axle elements by the removal of the retaining nuts 70.

Detachably secured on the forward end of the main frame rod 66 is a sleeve member 71 formed with a hitch tongue element 72 adapted to be engaged on a conventional hitch ball provided on the bumper of an automobile or other tractive vehicle. The sleeve element 71 is detachably secured to the forward end portion of rod 66 in any suitable manner, as by a removable transverse bolt 73, which, when removed, allows the sleeve member 71 to be detached from the rod 66. Rigidly secured on the sleeve member 71 is an upstanding strut bar 74 on which is mounted a conventional winch assembly 75 provided with a suitable cable, not shown, for attachment to the bow end of a boat, so that the boat may be pulled against the upwardly and forwardly inclined front strut bar 74.

Secured on the intermediate portion of the longitudinal main rod 66 of the frame 65 is a cradle member 76 which is shaped to supportingly engage the forward portion of the bottom of the boat. Upwardly and outwardly inclined auxiliary support members 77 are provided on the axle bar 67, spaced on opposite sides thereof, said members 77 being suitably padded, as by resilient deformable material, to supportingly engage the rear portion of the boat bottom. A scissors jack 78 is mounted on the intermediate portion of the axle bar 67, said jack 78 being shown in Figure 9 and comprising upwardly and inwardly extending opposing main link bars 79, 79 pivotally connected at their top ends to an abutment member 80 and drivingly engaged by a horizontal jack screw 81 at their lower ends, the linkage being substantially conventional and being arranged so that the abutment member 80 is elevated responsive to rotation of the jack screw 81 in one direction and lowered responsive to the rotation of said jack screw in the opposite direction. As will be presently explained, the jack 78 is employed to lift the rear end portion of the boat 40 off the inclined support member 77 at the final stage of placing the boat in the trailer housing 13.

Respective diagonal brace bars 83, 83 are pivoted at their rear ends to the opposite end portions of the axle bar 67, as shown at 84, the forward ends of the diagonal brace bars 83 being detachably secured by a transverse bolt 85 to the intermediate portion of the longitudinal bar 66. By removing the bolt 85, the brace bars 83, 83 may be swung to longitudinal positions, such as shown in dotted view in Figure 8, said bars 83 being receivable beneath the frame 12 of the main trailer and being releasably secured thereto by suitable fastening clips when the launching frame 65 is housed beneath the main frame of the trailer vehicle, as will be presently described.

The longitudinal main rod member 66 of the launching trailer 65 is slidably receivable in the tubular lower longitudinal frame bar 15 of the trailer main frame 12. Thus, the sleeve member 71 may be detached from the longitudinal rod member 66. Likewise, the intermediate supporting rest 76 may be detached from the rod 66 and the bars 83, 83 may be unfastened from the intermediate portion of the longitudinal rod 66 by removing the bolt 85. The bars 83, 83 may be swung to their longitudinal positions, above described and shown in dotted view in Figure 8, and the longitudinal bar member 66 may be telescopically engaged in the open end of the lower tubular bar member 15 of main frame 12. Likewise, the wheels 69 of the launching trailer 65 may be detached from the axle element 68. Thus, when it is desired to place the boat 40 in the main trailer housing 13, the various internal components in the housing are fastened in their stowed positions, shown in Figure 3, in the manner above described, providing a clearance space in the lower portion of housing 13 of sufficient size to receive the boat 40. The boat, mounted on the launching trailer 65 is placed rearwardly adjacent and in longitudinal alignment with the housing 13, with the rear panel 62 removed from the aperture 61. The cable 64 of winch 63 is then secured to the bow of the boat 40, whereby the boat may be drawn into the main trailer housing 13. The movement of the boat into the main trailer is facilitated by the provision of a first dolly 90 which is disposed under the forward portion of the boat and by the provision of a second dolly 91 which is disposed on the rear portion of the trailer floor with its rollers extending upwardly and engageable with the bottom of the boat 40.

Prior to pulling the boat into the trailer housing 13, the hitch sleeve 71 is unfastened from the longitudinal rod 66 of the trailer 65 and the diagonal bars 83 are unfastened by the removal of bolt 85, as above described and rotated to longitudinal positions, whereby they are receivable beneath the main trailer frame. The rest member 76 is likewise removed, and the member 66 telescopically engaged in the end of the lower longitudinal tubular bar member 15, whereby the launching trailer 65 is moved forwardly with the boat 40 as the cable 64 is wound up on the winch 63. When the boat is almost completely housed in the main trailer vehicle, the jack 78 may be employed to elevate the rear portion of the boat off the rest elements 77, facilitating the final placement of the boat in the trailer housing 13 in the position thereof shown in Figure 3. The wheels 69 of the launching trailer are likewise removed, whereby the framework of the launching trailer may be stowed fully beneath the trailer housing 13, and the brace bars 83 may be fastened by suitable clips provided therefor on the frame 12 of the main trailer.

The various detached parts such as the wheels 69, the rest member 76, the hitch sleeve 71, and the like, may be stowed in the main trailer housing 13 along with the boat 40.

As will be readily apparent, the structure of the present invention provides a means for transporting a boat 40 in a house trailer along with the launching trailer of the boat, all of the parts being stowed in a safe and compact manner and being easily removable at their intended location of use.

While a specific embodiment of an improved combination house and boat trailer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a boat trailer, a main wheeled frame adapted to supportingly receive a boat, a straight longitudinally extending tubular beam member secured beneath said main frame substantially in the longitudinal central vertical plane thereof and extending substantially for the entire length of said main frame, an auxiliary frame comprising a longitudinal main bar telescopically received in said tubular beam member, a transverse axle bar secured to the rear end of said main bar, ground-engaging wheels removably journaled on the ends of said transverse axle bar, and upstanding support elements on said axle bar spaced on opposite sides thereof and arranged to at times supportingly engage the underside of a boat.

2. In a boat trailer, a main wheeled frame adapted to supportingly receive a boat, a straight longitudinally extending tubular beam member secured beneath said main frame substantially in the longitudinal central vertical plane thereof and extending substantially for the entire length of said main frame, an auxiliary frame comprising a longitudinal main bar telescopically received in said tubular beam member, a transverse axle bar secured to the rear end of said main bar, ground-engaging wheels removably journaled on the ends of said transverse axle bar, upwardly and outwardly inclined support elements on said axle bar spaced on opposite sides thereof and arranged to at times supportingly engage the underside of a boat, and winch means on the forward ends of the main wheeled frame adapted to be connected to a boat mounted on the auxiliary frame to draw the auxiliary frame toward the main frame with said longitudinal main bar telescopically engaged in said tubular beam member.

3. In a boat trailer, a main wheeled frame adapted to supportingly receive a boat, a straight longitudinally extending tubular beam member secured beneath said main frame substantially in the longitudinal central vertical plane thereof and extending substantially for the entire length of said main frame, an auxiliary frame comprising a longitudinal main bar telescopically received in said tubular beam member, a transverse axle bar secured to the rear end of said main bar, ground-engaging wheels removably journaled on the ends of said transverse axle bar, upwardly and outwardly inclined support elements on said axle bar spaced on opposite sides thereof and arranged to at times supportingly engage the underside of a boat, jack means on the intermediate portion of said axle bar located substantially midway between said support elements and being connected and arranged to at other times engage the bottom of a boat and support the boat above said support elements, and winch means on the forward end of the main wheeled frame adapted to be connected to a boat mounted on the auxiliary frame to draw the auxiliary frame toward the main frame with said longitudinal main bar telescopically engaged in said tubular beam member.

References Cited in the file of this patent

UNITED STATES PATENTS

| | | |
|---|---|---|
| 2,468,925 | De Boer | May 3, 1949 |
| 2,558,418 | Brueckman | June 28, 1951 |
| 2,586,485 | Schroeder | Feb. 19, 1952 |
| 2,705,081 | Jacobs | Mar. 29, 1955 |
| 2,805,786 | Green | Sept. 10, 1957 |
| 2,812,088 | Cadillac et al. | Nov. 5, 1957 |
| 2,828,036 | White | Mar. 25, 1958 |
| 2,847,136 | Neff | Aug. 12, 1958 |